(12) United States Patent
Castinado et al.

(10) Patent No.: US 10,965,445 B2
(45) Date of Patent: *Mar. 30, 2021

(54) BLOCKCHAIN-BASED UNEXPECTED DATA DETECTION

(71) Applicant: Bank of America Corporation, Charlotte, NC (US)

(72) Inventors: Joseph Castinado, Northglenn, CO (US); John C. Checco, Stony Point, NY (US); Patrick Nicholas Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,646

(22) Filed: Sep. 27, 2019

(65) Prior Publication Data

US 2020/0028667 A1    Jan. 23, 2020

Related U.S. Application Data

(63) Continuation of application No. 15/828,052, filed on Nov. 30, 2017, now Pat. No. 10,567,156.

(51) Int. Cl.
| *H04L 9/06* | (2006.01) |
| *H04L 29/06* | (2006.01) |
| *H04L 9/32* | (2006.01) |
| *H04L 29/08* | (2006.01) |

(52) U.S. Cl.
CPC .......... *H04L 9/0618* (2013.01); *H04L 9/3239* (2013.01); *H04L 9/3247* (2013.01); *H04L 63/00* (2013.01); *H04L 67/108* (2013.01); *H04L 2209/38* (2013.01); *H04L 2209/56* (2013.01)

(58) Field of Classification Search
CPC ... H04L 9/0618; H04L 9/3247; H04L 9/3239; H04L 63/00; H04L 63/123; H04L 67/108; H04L 67/104; H04L 2209/38; H04L 2209/56

See application file for complete search history.

(56) References Cited

U.S. PATENT DOCUMENTS

| 9,298,806 | B1 | 3/2016 | Vessenes et al. |
| 9,397,985 | B1 | 7/2016 | Seger, II et al. |
| 9,558,524 | B2 | 1/2017 | Madhu et al. |
| 9,667,427 | B2 | 5/2017 | Oberhauser et al. |
| 9,703,986 | B1 | 7/2017 | Ashley et al. |
| 9,710,808 | B2 | 7/2017 | Slepinin |

(Continued)

OTHER PUBLICATIONS

US 9,832,212 B2, 11/2017, Aziz et al. (withdrawn)

(Continued)

*Primary Examiner* — Nelson S. Giddins
(74) *Attorney, Agent, or Firm* — Banner & Witcoff, Ltd.; Michael A. Springs

(57) ABSTRACT

Methods, systems, and apparatuses for blockchain-based unexpected data detection are described herein. In some arrangements, a node within a decentralized peer-to-peer (e.g., P2P) network may receive a plurality of network function requests corresponding to the decentralized network. The node may analyze the plurality of network function requests to identify whether the requests included unexpected data and/or irregular data, and/or are associated with flagged wallets and/or smart contracts.

17 Claims, 12 Drawing Sheets

(56) References Cited

U.S. PATENT DOCUMENTS

| | | |
|---|---|---|
| 9,749,140 B2 | 8/2017 | Oberhauser et al. |
| 9,794,074 B2 | 10/2017 | Toll et al. |
| 9,818,116 B2 | 11/2017 | Caldera |
| 9,824,215 B2 | 11/2017 | Dalcher |
| 9,824,216 B1 | 11/2017 | Khalid et al. |
| 9,824,217 B2 | 11/2017 | Kedma et al. |
| 9,824,218 B1 | 11/2017 | Kay et al. |
| 9,824,221 B2 | 11/2017 | Bahl |
| 9,824,222 B1 | 11/2017 | Kaplan et al. |
| 9,824,356 B2 | 11/2017 | Kurian |
| 9,825,766 B2 | 11/2017 | Sadhasivan et al. |
| 9,825,912 B2 | 11/2017 | Lopez et al. |
| 9,825,928 B2 | 11/2017 | Lelcuk et al. |
| 9,825,934 B1 | 11/2017 | Alexander |
| 9,825,973 B2 | 11/2017 | Sheleheda et al. |
| 9,825,976 B1 | 11/2017 | Gomez et al. |
| 9,825,978 B2 | 11/2017 | Siva Kumar et al. |
| 9,825,979 B2 | 11/2017 | Neil et al. |
| 9,825,984 B1 | 11/2017 | Hoover et al. |
| 9,825,985 B2 | 11/2017 | Beutel et al. |
| 9,825,986 B1 | 11/2017 | Bhatkar et al. |
| 9,825,988 B2 | 11/2017 | Crawford |
| 9,825,989 B1 | 11/2017 | Mehra et al. |
| 9,825,993 B2 | 11/2017 | Krywaniuk |
| 9,825,995 B1 | 11/2017 | Schroeder et al. |
| 9,826,023 B2 | 11/2017 | Yu |
| 9,826,335 B2 | 11/2017 | Cha et al. |
| 9,826,400 B2 | 11/2017 | Jakobsson |
| 9,830,162 B2 | 11/2017 | LeMay |
| 9,830,230 B1 | 11/2017 | Rai et al. |
| 9,830,239 B2 | 11/2017 | Nazari et al. |
| 9,830,304 B1 | 11/2017 | Simeonov et al. |
| 9,830,453 B1 | 11/2017 | Feiertag et al. |
| 9,830,458 B2 | 11/2017 | McBride et al. |
| 9,830,599 B1 | 11/2017 | Khen et al. |
| 9,831,912 B2 | 11/2017 | Henry et al. |
| 9,832,024 B2 | 11/2017 | Xu et al. |
| 9,832,141 B1 | 11/2017 | Raftery |
| 9,832,151 B2 | 11/2017 | Kumar et al. |
| 9,832,192 B2 | 11/2017 | Alonso Cebrian et al. |
| 9,832,209 B1 | 11/2017 | Cooley et al. |
| 9,832,211 B2 | 11/2017 | Hsiao et al. |
| 9,832,213 B2 | 11/2017 | Underwood et al. |
| 9,832,215 B2 | 11/2017 | Gafni et al. |
| 9,832,216 B2 | 11/2017 | Kaloroumakis et al. |
| 9,832,217 B2 | 11/2017 | Berger et al. |
| 9,832,222 B2 | 11/2017 | Hutton |
| 9,832,223 B2 | 11/2017 | Eytan et al. |
| 9,832,227 B2 | 11/2017 | Bhargava et al. |
| 9,832,232 B1 | 11/2017 | Havemose |
| 9,832,674 B2 | 11/2017 | Ghai |
| 9,832,802 B2 | 11/2017 | Kreiner et al. |
| 2011/0196788 A1 | 8/2011 | Lu et al. |
| 2014/0058937 A1 | 2/2014 | Watson |
| 2015/0324789 A1* | 11/2015 | Dvorak ............ G06Q 20/3274 705/67 |
| 2015/0332262 A1 | 11/2015 | Lingappa |
| 2015/0348017 A1 | 12/2015 | Allmen |
| 2016/0261404 A1 | 9/2016 | Ford et al. |
| 2016/0292680 A1 | 10/2016 | Wilson, Jr. et al. |
| 2017/0005804 A1* | 1/2017 | Zinder ................ H04L 63/123 |
| 2017/0140375 A1 | 5/2017 | Kunstel |
| 2017/0178237 A1 | 6/2017 | Wong |
| 2017/0300627 A1* | 10/2017 | Giordano ........... G06F 21/6245 |
| 2018/0075686 A1 | 3/2018 | Campero et al. |
| 2018/0204191 A1 | 7/2018 | Wilson et al. |
| 2018/0204192 A1 | 7/2018 | Whaley et al. |
| 2018/0218176 A1 | 8/2018 | Voorhees et al. |
| 2019/0019180 A1 | 1/2019 | Coburn et al. |
| 2019/0220831 A1 | 7/2019 | Rangarajan et al. |
| 2020/0111066 A1* | 4/2020 | Anstey ................ H04L 67/1044 |

OTHER PUBLICATIONS

Oct. 30, 2019—U.S. Notice of Allowance—U.S. Appl. No. 15/828,052.
Swan, Melanie, "Blockchain—Blueprint for a New Economy," O'Reilly Media, Inc., retrieved from <http://w2.blockchain-tec.net/blockchain/blockchain-by-melanie-swan.pdf>, Feb. 2015, 149 pages.
Noyes, Charles, "BitAV: Anti-Malware by Distributed Blockchain Consensus and Feedforward Scanning," Jan. 7, 2016, retrieved from <https://arxiv.org/pdf/1601.01405.pdf>, 10 pages.
Raje, et al, "Decentralised Firewall for Malware Detection," Nov. 3, 2017, retrieved from <https://arxiv.org/pdf/1711.01353.pdf>, 5 pages.
Heires, Katherine, "The Risks and Rewards of Blockchain Technology," Mar. 1, 2016, retrieved from http://www.rmmagazine.com/2016/03/01/the-risks-and-rewards-ofblockchain-technology/, 4 pages.
Wressnegger, et al., "Automatically Inferring Malware Signatures for Anti-Virus Assisted Attacks," ASOA CCS '17, retrieved from http://dx.doi.org/10.1145/3052973.3053002, pp. 587-598.

* cited by examiner

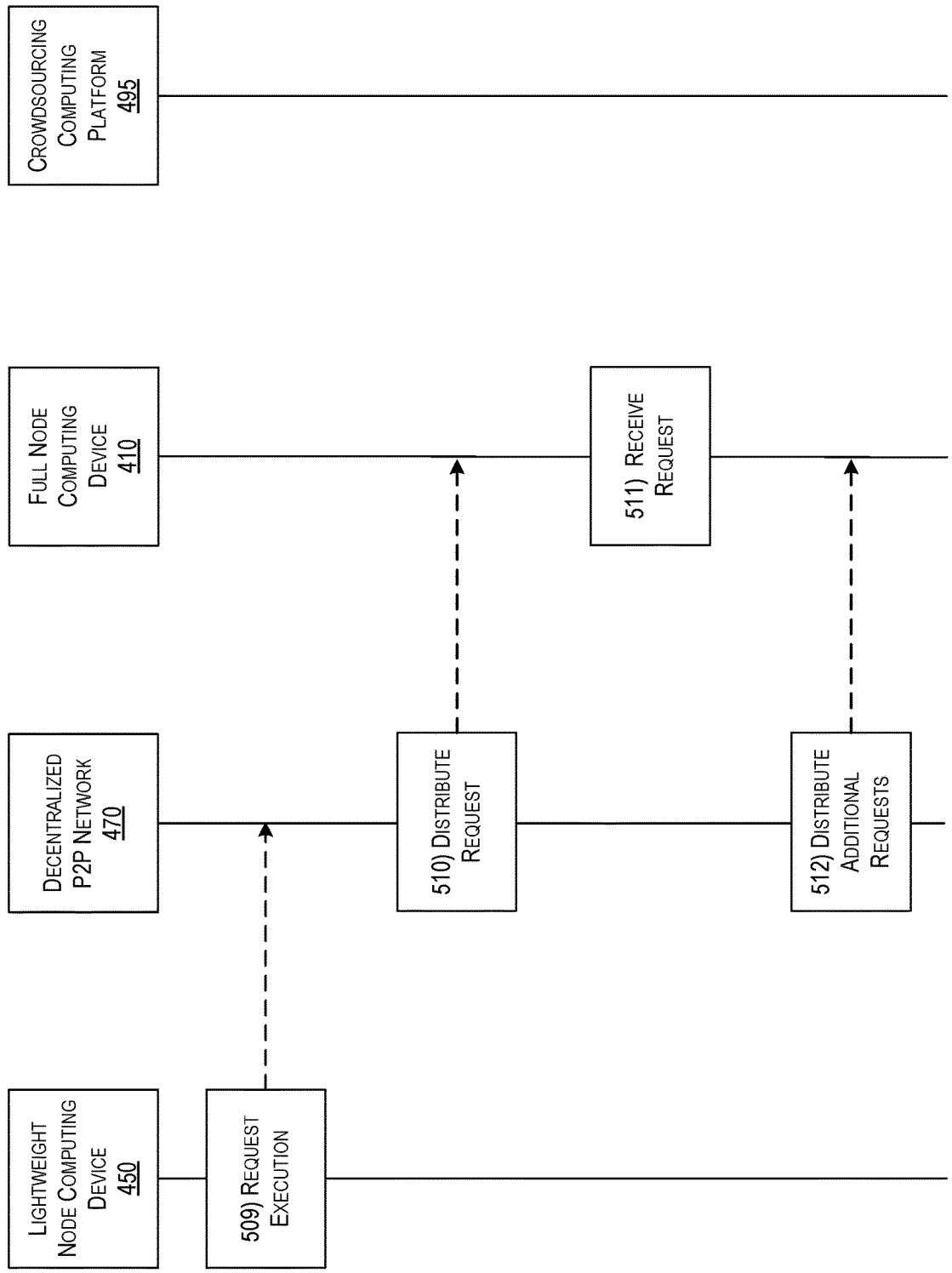

BLOCKCHAIN-BASED UNEXPECTED DATA DETECTION

CROSS REFERENCE TO RELATED APPLICATIONS

This application is a continuation of and claims priority to co-pending U.S. patent application Ser. No. 15/828,052 filed Nov. 30, 2017, and entitled "Blockchain-Based Unexpected Data Detection," which is incorporated herein by reference in its entirety.

FIELD

Aspects described herein generally relate to decentralized peer-to-peer (e.g., P2P) computer systems specialized for the purpose of managing a blockchain. In particular, one or more aspects of the disclosure relate to analyzing blockchain data to identify unexpected data entries and/or data irregularities.

BACKGROUND

In decentralized P2P computer systems, computing devices may execute network protocols in order to serve as nodes in a P2P network. Each of the nodes may perform functions of the P2P network such as content dissemination, data storage, balance sheet management, smart contract execution, and the like. In some instances, the nodes forming the P2P network may further operate to generate and maintain a blockchain data structure, which may be comprised of a concatenation of data elements (e.g., blocks) that store data related to the P2P network. For example, each of the nodes of the P2P network may have a copy of the blockchain stored in memory and, responsive to performing the functions of the P2P network, may store the data generated in the blockchain.

While the data stored in the blocks of the blockchain may generally be of one or more specific types and formats corresponding to the network functions, there may be cases in which unexpected data and/or data irregularities might be included in the blocks of the blockchain. Furthermore, the unexpected data and/or data irregularities might occur in pending network functions yet to be performed by the nodes of the P2P network. In some instances, the unexpected data and/or data irregularities may include fraudulent data, computer viruses, malware, and/or any other nefarious information.

It may be vital to detect such unexpected data and/or data irregularities in order to maintain the viability of the decentralized P2P network, integrity of the blockchain, and unadulterated execution of operations at each of the nodes within the decentralized P2P network. As such, there will always be a need for apparatuses, systems, and methods for the detection of unexpected data and/or data irregularities in blockchain data and/or pending data yet to be added to a blockchain.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards apparatuses, systems, and methods for blockchain-based unexpected data detection.

In accordance with one or more embodiments, a computing device configured to operate in a P2P network and including at least one or more processors and memory storing at least a blockchain of the P2P network may receive a first plurality of network function requests, wherein each of the first plurality of network function requests is associated with a particular wallet. The computing device may create a first pending block of the blockchain of the P2P network, wherein the first pending block includes the first plurality of network function requests. The computing device may scan each of the first plurality of network function requests based on one or more security criteria. Based on the scanning, the computing device may identify at least one network function request of the plurality of network function requests that violates at least one of the one or more security criteria. Responsive to identifying the at least one network function request that violates at least one of the one or more security criteria, the computing device may flag at least one wallet associated with the at least one network function request.

In some embodiments, the computing device may compare an identifier corresponding to the at least one flagged wallet with a plurality of identifiers corresponding to previously flagged wallets, wherein each of the previously flagged wallets is associated with a flag rating. Based on the comparison, the computing device may identify that the identifier corresponding to the at least one flagged wallet matches with at least one of the plurality of identifiers corresponding to the previously flagged wallets. The computing device may update the flag rating associated with the at least one flagged wallet matched with at least one of the previously flagged wallets.

In some embodiments, the computing device may receive, from a user of the computing device, entry of information corresponding to a network function request involving the at least one flagged wallet. The computing device may display the flag rating associated with the at least one flagged wallet.

In some embodiments, the network function request and the first plurality of network function requests include one or more of balance sheet transaction requests and smart contract operation requests.

In some embodiments, the computing device may add the first pending block to the blockchain of the P2P network. The computing device may receive a second plurality of network function requests related to a second pending block of the blockchain of the P2P network, wherein at least one of the second plurality of network function requests references the at least one flagged wallet.

In some embodiments, the computing device may remove the at least one of the second plurality of network function requests from the second pending block based on the reference to the at least one flagged wallet. The computing device may add the second pending block to the blockchain of the P2P network without performing a function corresponding to the at least one of the second plurality of network function requests.

In some embodiments, the at least one of the plurality of network function requests that references the at least one flagged wallet is a smart contract request associated with the at least one flagged wallet. The computing device may identify a block of the blockchain comprising a smart contract corresponding to the smart contract request. The computing device may parse the smart contract to identify one or more operations associated with the smart contract. The computing device may determine that at least one of the one or more operations is a malicious operation. The computing device may execute the smart contract without performing the malicious operation. The computing device may add the second pending block to the blockchain of the P2P network.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5G depict an illustrative event sequence for blockchain-based unexpected data detection in accordance with one or more example embodiments described herein.

DETAILED DESCRIPTION

Figure 1:
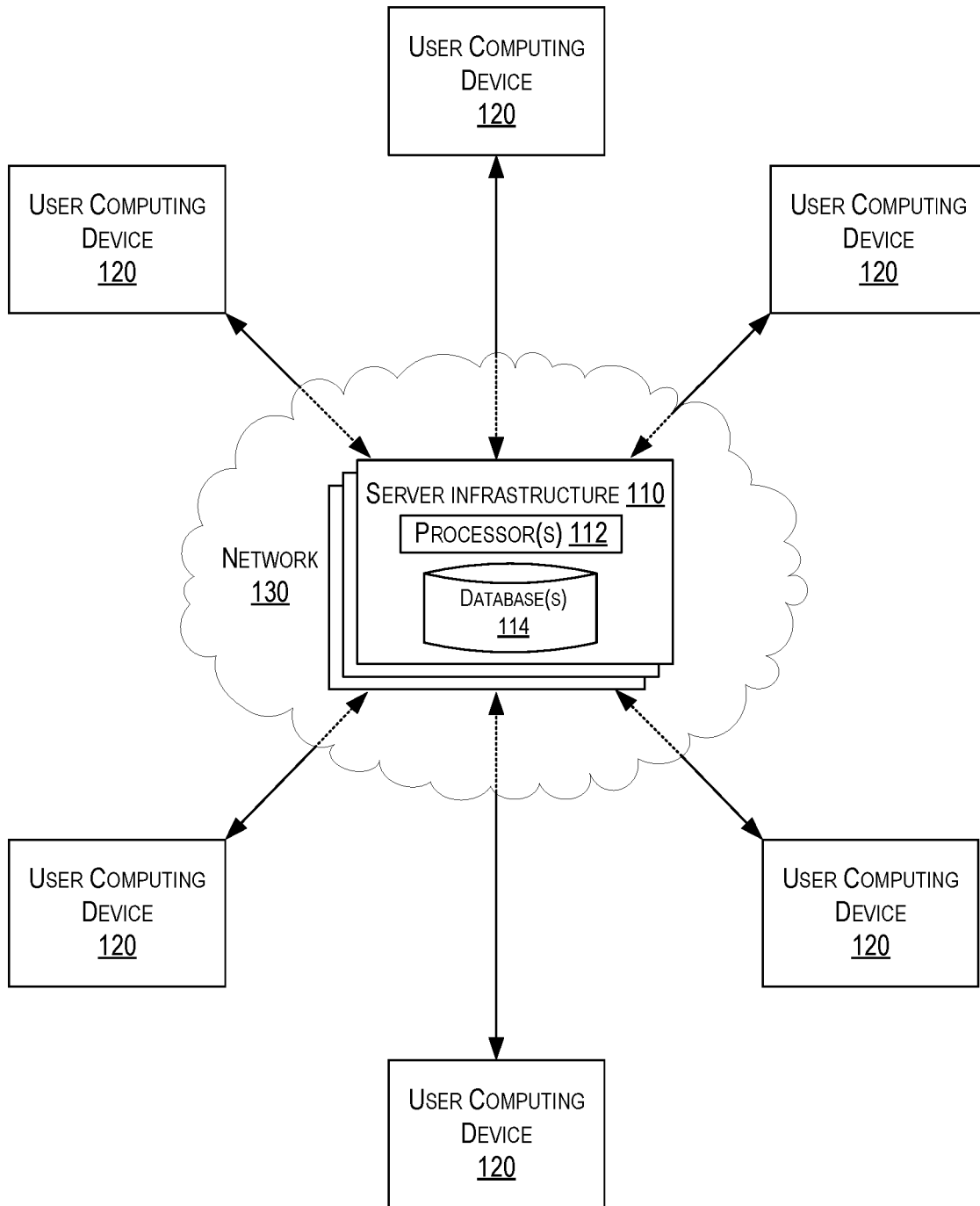
FIG. 1 depicts an illustrative centralized computer system that may be used in accordance with one or more example embodiments described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in further detail below, aspects described herein are directed towards apparatuses, systems, and methods for the detection of unexpected data and/or data irregularities in blockchain data and/or pending data yet to be added to a blockchain. In decentralized P2P networks, computing devices serving as nodes within the P2P network may operate in concert to support the network and perform functions corresponding to the network. The data generated during performance of network functions may be stored in a blockchain data structure that is commonly shared by the nodes within the decentralized network. Depending on the network functions performed by the nodes, the data generated may typically be of one or more consistent types and formats. However, in some instances, the network functions may include unexpected data and/or data irregularities extending beyond the one or more types and formats expected by the network. Such unexpected data and/or data irregularities data may include fraudulent data, computer viruses, malware, and/or any other nefarious information.

In some embodiments described herein, a computing node may operate in a P2P network, along with other computing nodes, to perform functions associated with the P2P network and manage a blockchain configured to store data related to performed functions of the P2P network. The computing node may be configured to analyze data previously stored in the blockchain to identify unexpected data and/or data irregularities related to previously executed network functions. In some instances, the computing node may be further configured to analyze requested network functions yet to be performed by the P2P network for unexpected data and/or data irregularities. Responsive to identifying unexpected data and/or data irregularities in the blockchain and/or in requested network functions yet to be performed by the P2P network, the computing device may flag a wallet and/or smart contract associated with the unexpected data and/or data irregularities. Furthermore, the computing device may report the flagged wallet and/or smart contract, and/or the unexpected data and/or data irregularities to each of the other of computing devices serving as nodes in the P2P network, and/or a crowdsourcing computing platform which may include a data repository storing information related to each flagged wallet and/or smart contract, and/or the totality of identified unexpected data and/or data irregularities. Through the identification of unexpected data and/or data irregularities, as well as wallets associated with requests comprising the unexpected data and/or data irregularities, the computing device may serve in the creation of an auditing dynamic of the blockchain and thereby maintain the viability of the decentralized P2P network, integrity of the blockchain, and unadulterated execution of operations at each of the nodes within the decentralized P2P network.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and misuse and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and misuse and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
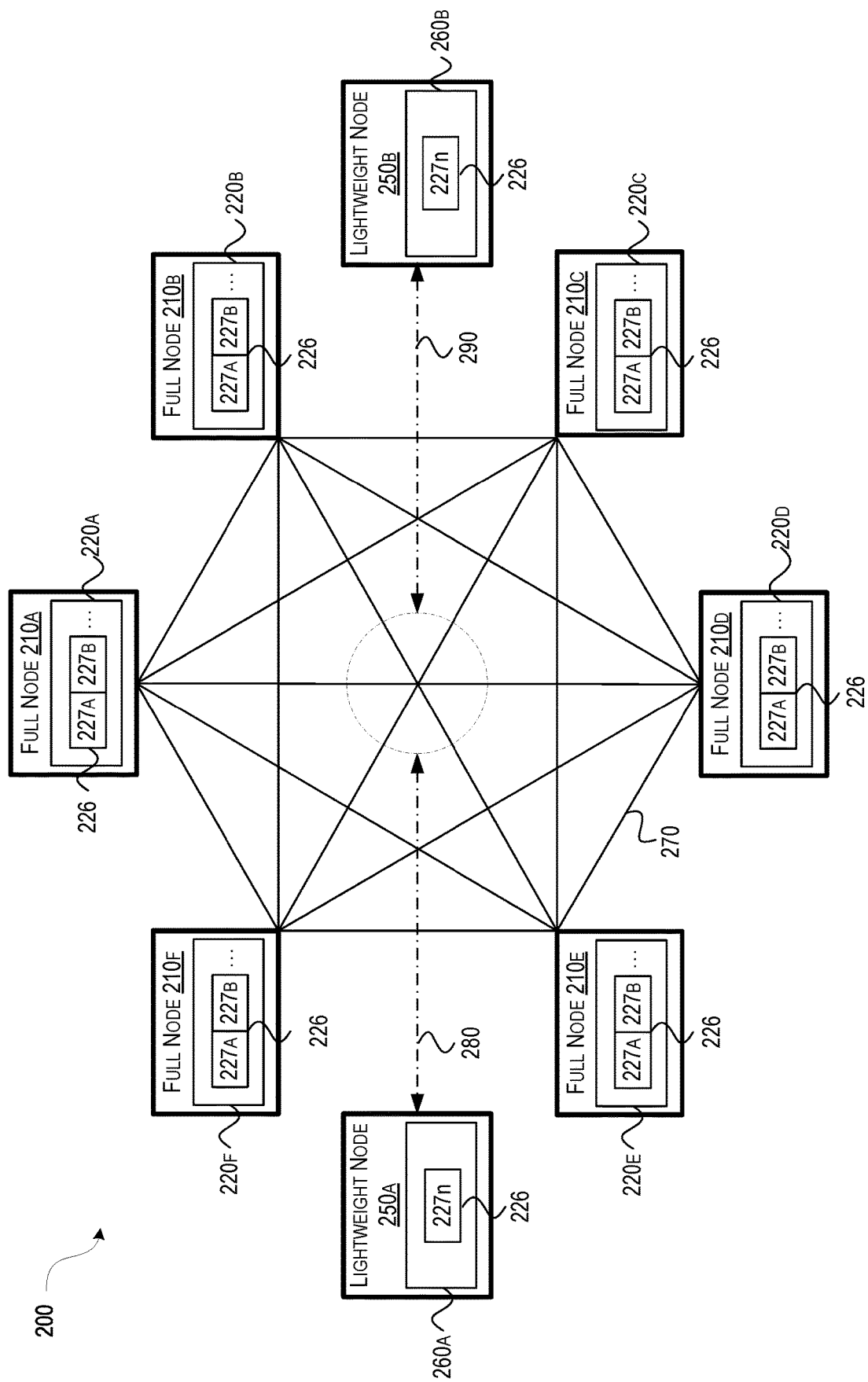
FIG. 2 depicts an illustrative decentralized P2P computer system that may be used in accordance with one or more example embodiments described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-

210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to select delegates based on balance sheet holdings associated with the respective wallets. Full node computing devices 210A-210F, however, may not select themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, currency exchange and remittance, P2P transfers, ride sharing, gaming, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3:
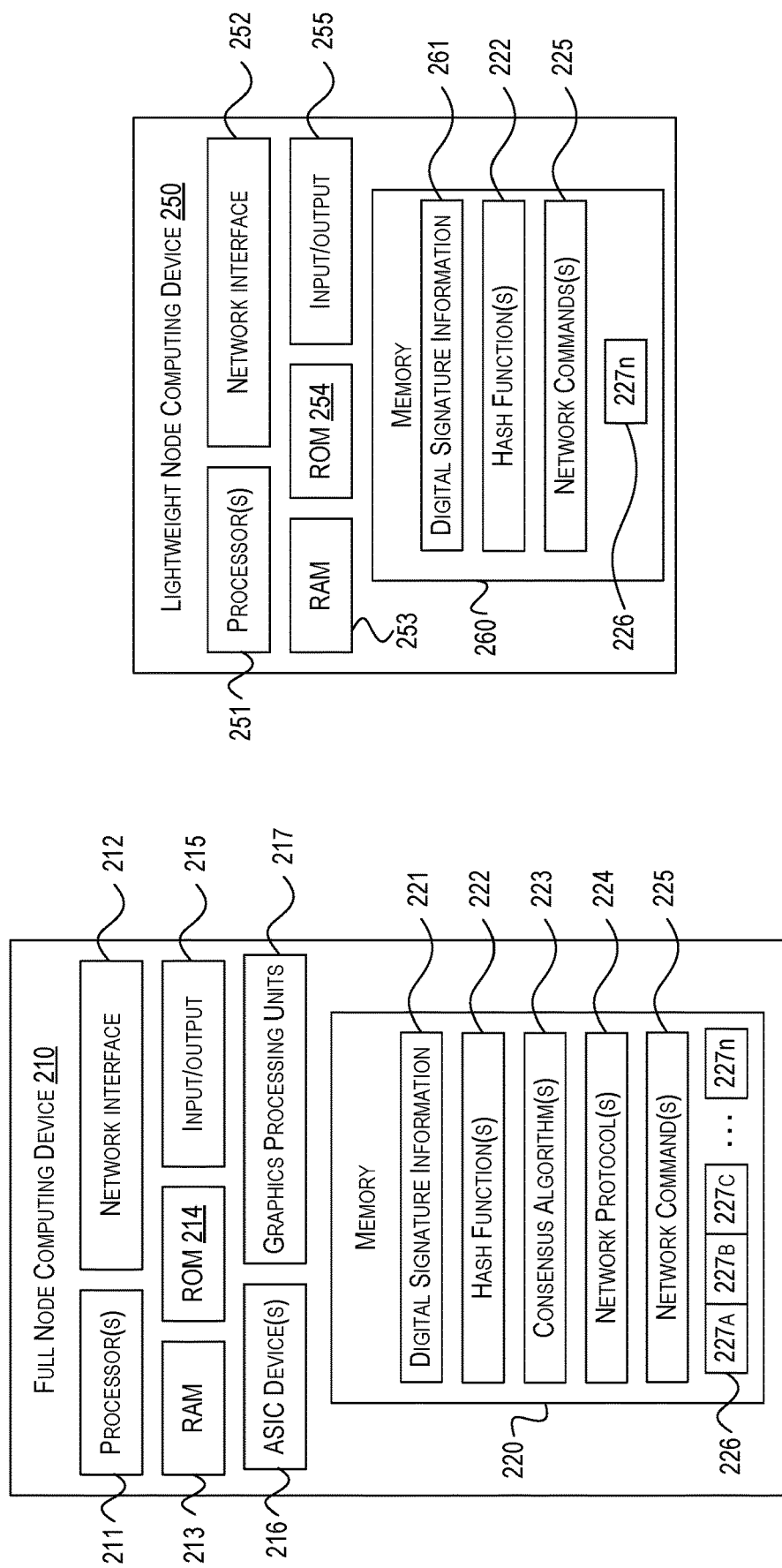
FIG. 3A depicts an illustrative full node computing device that may be used in accordance with one or more example embodiments described herein.
FIG. 3B depicts an illustrative lightweight node computing device that may be used in accordance with one or more example embodiments described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Blockchain-Based Unexpected Data Detection

Figure 4:
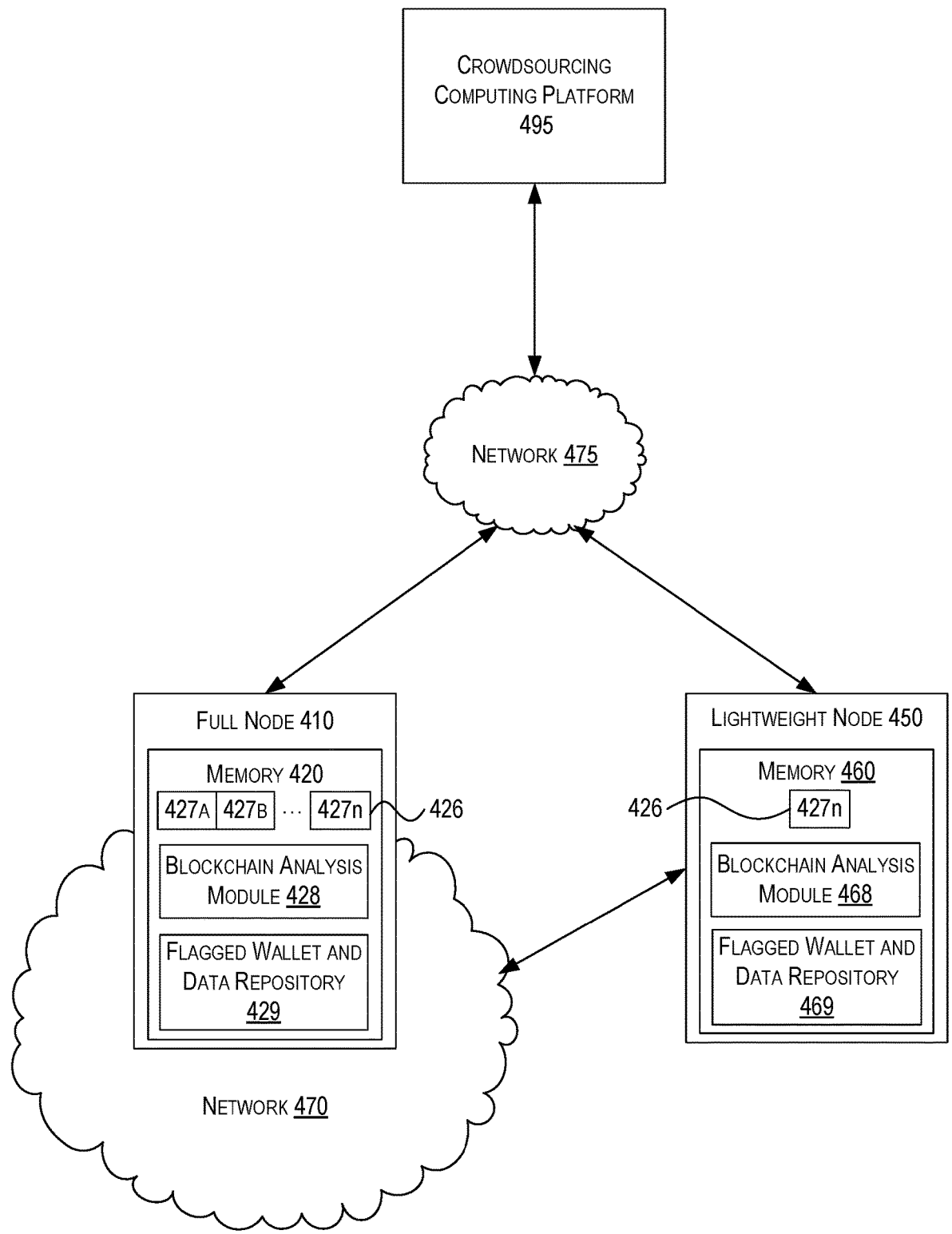
FIG. 4 depicts an illustrative computing environment for blockchain-based unexpected data detection that may be used in accordance with one or more example embodiments described herein.

FIG. 4 depicts an illustrative computing environment for blockchain-based unexpected data detection that may be used in accordance with one or more example embodiments described herein. Referring to FIG. 4, computing environment 400 may include full node computing device 410, lightweight node computing device 450, and crowdsourcing computing platform 495. Full node computing device 410 may be configured to operate as a node within decentralized P2P network 470, and lightweight node computing device 450 may be configured to transmit network requests to decentralized P2P network 470, which may be executed by full node computing device 410. Furthermore, each of full node computing device 410 and lightweight node computing device 450 may be configured to communicate with crowdsourcing computing platform 495, as well as other computing devices, through computer network 475.

Full node computing device 410 may be similar to full node computing devices 210A-210F described above in regard to FIG. 2, as well as full node computing device 210 described above in regard to FIG. 3A. Full node computing device 410 may be configured to operate in decentralized P2P network 470 and may be further configured to execute requested network functions and maintain inter-nodal agreement as to the state of blockchain 426 of decentralized P2P network 470, as well as to request execution of network functions. As described herein, such network functions may include smart contract operations and balance sheet transactions. While a single full node computing device 410 is depicted in FIG. 4, it should be understood that a plurality of full node computing devices may be included in computing environment 400.

Full node computing device 410 may be configured to interact with lightweight node computing device 450 directly and/or indirectly through decentralized P2P network 470, and may further be configured to interact with crowdsourced computing platform 495. In particular, full node computing device 410 may be able to transmit and receive information corresponding to blockchain-based unexpected data detection with lightweight node computing device 450 and/or crowdsourced computing platform 495. Such information may include identifiers of flagged wallets and/or smart contracts, such as public keys associated with the flagged wallets and/or smart contracts, as well as identified unexpected data and/or data irregularities associated with the flagged wallets and/or smart contracts. Additionally and/or alternatively, such information may also include a block number and/or network request identifier corresponding to a block within blockchain 426 that comprises unexpected data and/or data irregularities. Other information may be communicated between full node computing device 410, lightweight node computing device 450, and/or crowdsourcing computing platform 495.

In performing the blockchain-based unexpected data detection described herein, processors of full node computing device 410 may execute one or more computer-executable instructions stored in memory 420. For example, processors of full node computing device 410 may execute instructions of blockchain analysis module 428, which may cause full node computing device 410 to analyze data comprised within blocks 427A, 427B, . . . 427N of blockchain 426 to identify unexpected data and/or data irregularities stored within the blocks. Such unexpected data and/or data irregularities may correspond to previously executed network functions of decentralized P2P network 470. In some instances, blockchain analysis module 428 may store further instructions that cause full node computing device 410 to analyze requested network functions yet to be performed by the full node computing devices of decentralized P2P network 470 for unexpected data and/or data irregularities.

Additionally and/or alternatively, full node computing device 410 may be configured to identify and flag wallets and/or smart contracts corresponding to previously executed and/or yet to be executed network functions including identified unexpected data and/or data irregularities. Identifiers associated with the flagged wallets and/or smart contracts, such as public keys, as well as the unexpected data and/or data irregularities, may be stored in flagged wallet and data repository 429 of memory 420 of full node computing device 410. As stated above, in some arrangements, full node computing device 410 may be configured to interface with lightweight node computing device 450 and/or crowdsourcing computing platform 495 to transmit and receive information related to flagged wallets and/or smart contracts, as well as unexpected data and/or data irregularities.

Flagged wallet and data repository 429 may store information corresponding to identified unexpected data and/or data irregularities, identifiers associated with flagged wallets and/or smart contracts corresponding to identified unexpected data and/or data irregularities, and/or generic fraudulent data, malware, viruses, and/or other nefarious data. In some instances, flagged wallet and data repository 429 may store additional information such as a standard and/or approved balance sheet transaction requests and/or smart contracts of decentralized P2P network 470. As described in further detail below, the information stored in flagged wallet and data repository 429 may be used as security criteria by blockchain analysis module 428 in identifying flagged wallets and/or smart contracts, as well as unexpected data and/or data irregularities.

Lightweight node computing device 450 may be similar to lightweight node computing devices 250A and 250B described above in regard to FIG. 2, as well as lightweight node computing device 250 described above in regard to FIG. 3B. Lightweight node computing device 450 may be configured to interface with decentralized P2P network 470 by requesting execution of network functions. In some instances, lightweight node computing device 450 may store blockchain 426. Blockchain 426 stored in memory 460 of lightweight node computing device 450 may include at least block 427n, which may represent the most immediate block of blockchain 426. In some arrangements, blockchain 426 stored in memory 460 of lightweight node computing device 450 may include additional blocks. While a single lightweight node computing device 450 is depicted in FIG. 4, it should be understood that a plurality of lightweight node computing devices 450 may be included computing environment 400.

Lightweight node computing device 450 may be configured to interact with full node computing device 410 directly and/or indirectly through decentralized P2P network 470. Lightweight node computing device 450 may further be configured to interact with crowdsourced computing platform 495. In particular, lightweight node computing device 450 may be configured to transmit and receive information corresponding to blockchain-based unexpected data detection with full node computing device 410 and/or crowdsourced computing platform 495.

Lightweight node computing device 450 may be configured similarly to full node computing device 410 in performing the blockchain-based unexpected data detection described herein. For example, lightweight node computing device 450 may include blockchain analysis module 468 stored in memory 460. When executed by processors of lightweight node computing device 450, blockchain analysis module 468 may cause lightweight node computing device 450 to analyze data comprised within block 427N of blockchain 426 to identify unexpected data and/or data irregularities stored within the block. Furthermore, lightweight node computing device 450 may be configured to identify and flag wallets and/or smart contracts corresponding to previously executed network functions including unexpected data and/or data irregularities. Identifiers associated with the flagged wallets and/or smart contracts, such as public keys, as well as the unexpected data and/or data irregularities, may be stored by lightweight node computing device 450 in flagged wallet and data repository 469 of memory 460. Lightweight node computing device 450 may be configured to interface with full node computing device 410 and/or crowdsourcing computing platform 495 to transmit and receive information related to flagged wallets and/or smart contracts, as well as unexpected data and/or data irregularities.

Flagged wallet and data repository 469 may store information corresponding to identified unexpected data and/or data irregularities, identifiers associated with flagged wallets and/or smart contracts corresponding to identified unexpected data and/or data irregularities, and/or generic fraudulent data, malware, viruses, and/or other nefarious data. In some instances, flagged wallet and data repository 469 may store additional information such as a standard and/or approved balance sheet transaction requests and/or smart contracts of decentralized P2P network 470. As described in further detail below, the information stored in flagged wallet and data repository 469 may be used as security criteria by blockchain analysis module 468 in identifying flagged wallets and/or smart contracts, as well as unexpected data and/or data irregularities.

Crowdsourcing computing platform 495 may store information related to wallets and/or smart contracts, flagged wallets and/or flagged smart contracts, as well as unexpected data and/or data irregularities as related to blockchain 426 of decentralized P2P network 470. In particular, crowdsourcing computing platform 495 may store information related to wallets and smart contracts which were reviewed and/or rated by nodes in decentralized P2P network 270 and each flagged wallet and/or flagged smart contract identified by full node computing device 410 and/or lightweight node computing device 450. In some instances, crowdsourcing computing platform 495 may store information related to flagged wallets and/or flagged smart contracts identified by other full node computing devices, lightweight node computing devices, and/or other computing devices in computing environment 400. Additionally and/or alternatively, crowdsourcing computing platform 495 may further store information related to the unexpected data and/or data irregularities stored in blockchain 426 of decentralized P2P network 470. Such information may be provided by full node computing device 410, lightweight node computing device 450, other full node computing devices and/or lightweight node computing devices, and/or other computing devices in computing environment 400.

In some arrangements described in further detail below, crowdsourcing computing platform 495 may serve as a central data repository for wallets and/or smart contracts, flagged wallets and/or flagged smart contracts, as well as unexpected data and/or data irregularities. Crowdsourcing computing platform 495 may be referred to by full node computing device 410 and/or lightweight node computing device 450 prior to requesting performance of network functions. For example, in the event that full node computing device 410 and/or lightweight node computing device 450 is to request performance of a network function, such as a balance sheet transaction and/or smart contract operation, full node computing device 410 and/or lightweight node computing device 450 may query crowdsourcing computing platform 495 regarding a wallet and/or smart contract corresponding to the network request prior to broadcasting the request to decentralized P2P network 470. Crowdsourcing computing platform 495 may be configured to return information to full node computing device 410 and/or lightweight node computing device 450 regarding the wallet and/or smart contract. Such information may include an indication of whether or not the wallet and/or smart contract is flagged, a flag rating associated with the wallet and/or smart contract, a review rating associated with the wallet and/or smart contract, and so on. In some instances, flag ratings, review ratings, and/or reviews may also be stored at lightweight node computing device 450 and/or full node computing device 410, respectively in flagged wallet and data repository 469 and 429.

As described herein, a flag rating associated with a wallet and/or smart contract may be a numerical percentage which corresponds to the number of times the wallet and/or smart contract has been flagged for including unexpected data and/or data irregularities. For example, a wallet and/or smart contract that has never been flagged may have a flag rating of 100%. Conversely, a wallet and/or smart contract that has been flagged at least once may have a flag rating of less than 100%. In some instances, a mathematical relationship may govern the ratio between number of flaggings and percentage decrease in flag rating.

A review rating associated with a wallet and/or smart contract may be one or more numerical values and/or percentages which correspond to a review of the wallet and/or smart contract provided to crowdsourcing computing platform 495 by one or more users that have interacted with the wallet and/or smart contract. For example, reviews may be provided to crowdsourcing computing platform 495 regarding wallets and/or smart contracts. The reviews may include an indication of "like" or "dislike," an amount of stars, a grade from 1-100, and so on, which serve to indicate a quality rating of the wallet and/or smart contract. In some instances, the reviews may further include comments regarding the wallet and/or smart contract. Each of the reviews for the wallet and/or smart contract may be compiled by crowdsourcing computing platform 495 and may be viewable by users accessing the computing platform.

As stated above, computing environment 400 may further include decentralized P2P network 470 in which full node computing device 410 may be configured as a node. Decentralized P2P network 470 may be similar to decentralized P2P network 270 described above in regard to FIG. 2. As such, decentralized P2P network 470 may be formed by a plurality of full node computing devices operating network protocols associated with decentralized network 470. Furthermore, network functions performed by decentralized network 470 may be configured to be stored by the full node computing devices of decentralized P2P network 470 on blockchain 427.

Additionally, computing environment 400 may also include one or more networks, which may interconnect one or more of full node computing device 410, lightweight node computing device 450, crowdsourcing computing platform 495, and/or other computing devices. For example, computing environment 400 may include network 475. Network 475 may include one or more sub-networks (e.g., local area networks (LANs), wide area networks (WANs), or the like). Each of full node computing device 410, lightweight node computing device 450, crowdsourcing computing platform 495, and/or other computing devices of computing environment 400 may be configured to communicate through network 475.

FIGS. 5A-5G depict an illustrative event sequence for blockchain-based unexpected data detection in accordance with one or more example embodiments described herein. While the steps of the event sequence of FIGS. 5A-5G are described in a particular order, it should be understood that the steps may be described in any order without departing from the scope of the disclosure provided herein. Furthermore, even though the event sequence is described as being performed by a particular arrangement of computing devices and computer networks (e.g., full node computing device 410, lightweight node computing device 450, decentralized P2P network 470, and crowdsourcing computing device 495), the processes may be performed by a number of computing devices and/or computing networks greater or less than that described in regard to FIGS. 5A-5G.

Figure 5A:
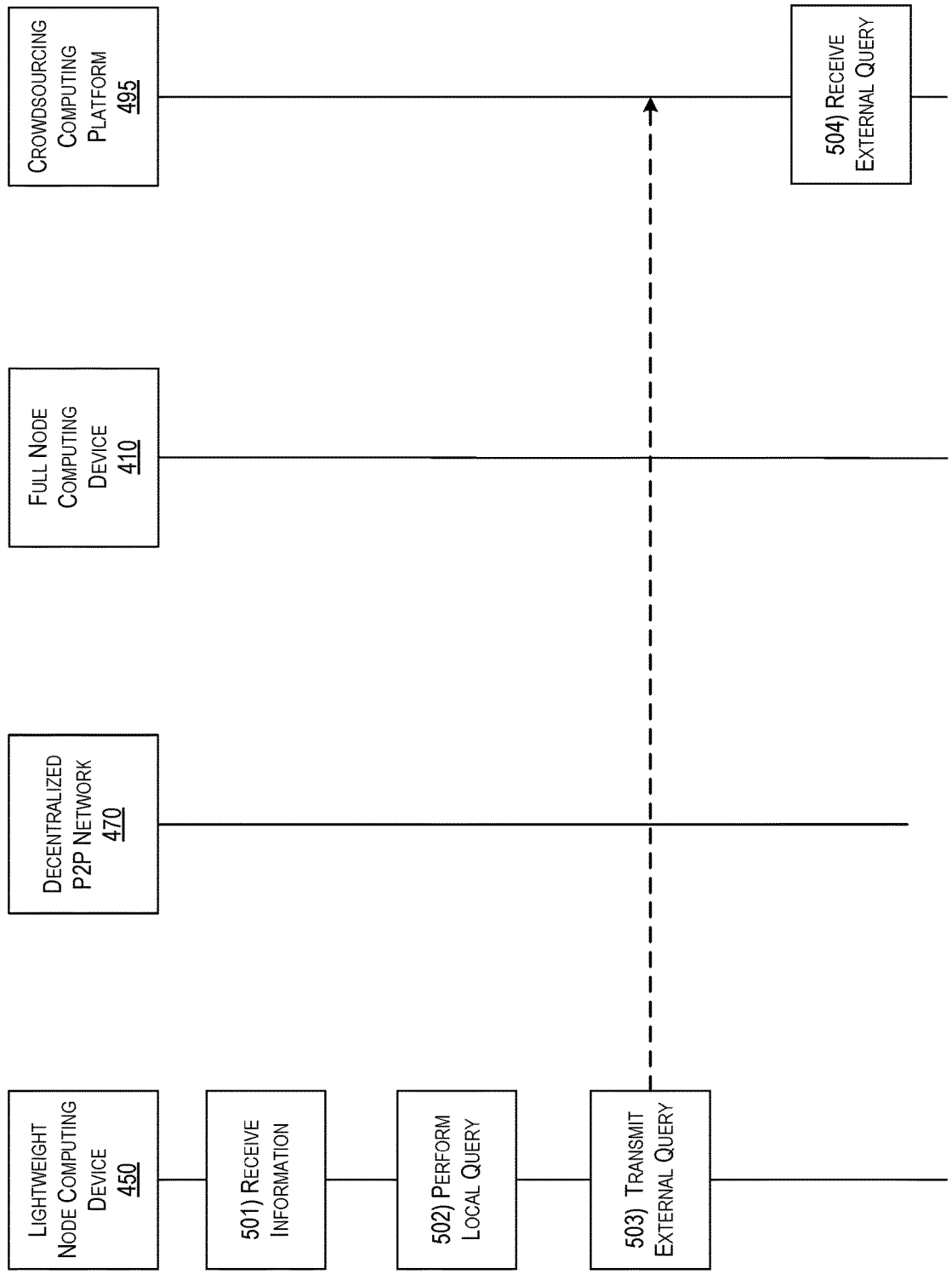

Referring to FIG. 5A, at step 501, lightweight node computing device 450 may receive information corresponding to a first network function request from a user. The first network function request may be a balance sheet transaction request, smart contract operation request, and the like. In some instances, the first network function request may be received at full node computing device 410 and the information for the first network function request may be provided by a user of full node computing device 410.

In the event that the first network function request is a balance sheet transaction request which entails a data transfer from a wallet associated with lightweight node computing device 450 to a wallet associated with another node within decentralized P2P network 470, the information provided by the user of lightweight node computing device 450 may include at least a data type, data amount, processing fee amount to be distributed to full node computing devices within decentralized P2P network 470 for processing the balance sheet transaction request, and an identifier (e.g., public key) of the wallet of the node receiving the data transfer.

In the event that the first network function request is a smart contract operation request which entails a data transfer from a wallet associated with lightweight node computing device 450 to a smart contract of decentralized P2P network 470, the information provided by the user of lightweight node computing device 450 may include at least a data type, data amount, processing fee amount to be distributed to full node computing devices within decentralized P2P network 470 for processing the smart contract operation, and an identifier (e.g., public key) of the smart contract receiving the data transfer.

At step 502, processors of lightweight node computing device 450 may execute blockchain analysis module 428 to perform a local query of flagged wallet and data repository 469 of memory 460 to identify information regarding the wallet and/or smart contract corresponding to the first network function request. In particular, processors of lightweight node computing device 450 may execute blockchain analysis module 428 to perform the local query of flagged wallet and data repository 469 based on the identifier of the wallet and/or smart contract to identify whether the wallet and/or smart contract was previously flagged by lightweight computing device 450. In some instances, the wallet and/or smart contract may have been previously flagged by lightweight node computing device 450 and an identifier associated with the wallet and/or smart contract may have been stored in flagged wallet and data repository 469 along with other information. Additionally and/or alternatively, the wallet and/or smart contract may have been previously flagged by one or more other nodes within decentralized P2P network 470 and lightweight node computing device 450 may have received notification from the one or more other nodes regarding the flagged wallet and/or smart contract and stored the notification in flagged wallet and data repository 469. In the event that the wallet and/or smart contract corresponding to the network function request was previously flagged, the local query of flagged wallet and data repository 469 may return an indication that the wallet and/or smart contract was previously flagged. Conversely, in the event that the wallet and/or smart contract was not previously flagged, then the local query may return empty. In some instances, the wallet and/or smart contract may not have been previously flagged, but may have been reviewed lightweight node computing device 450, full node computing device 410, and/or another node in decentralized P2P network 470. In such instances, the review may include a brief discussion of the wallet and/or smart contract and a corresponding rating.

At step 503, lightweight node computing device 450 may transmit an external query to crowdsourcing computing platform 495 to identify information regarding the wallet and/or smart contract corresponding to the first network function request. In particular, lightweight node computing device 450 may transmit an external query request to crowdsourcing computing platform 495 which may include at least the identifier of the wallet and/or smart contract associated with the first network function request. In some instances, step 503 may be performed independent of and/or in addition to step 502. At step 504, crowdsourcing computing platform 495 may receive the external query request from lightweight node computing device 450.

Figure 5B:
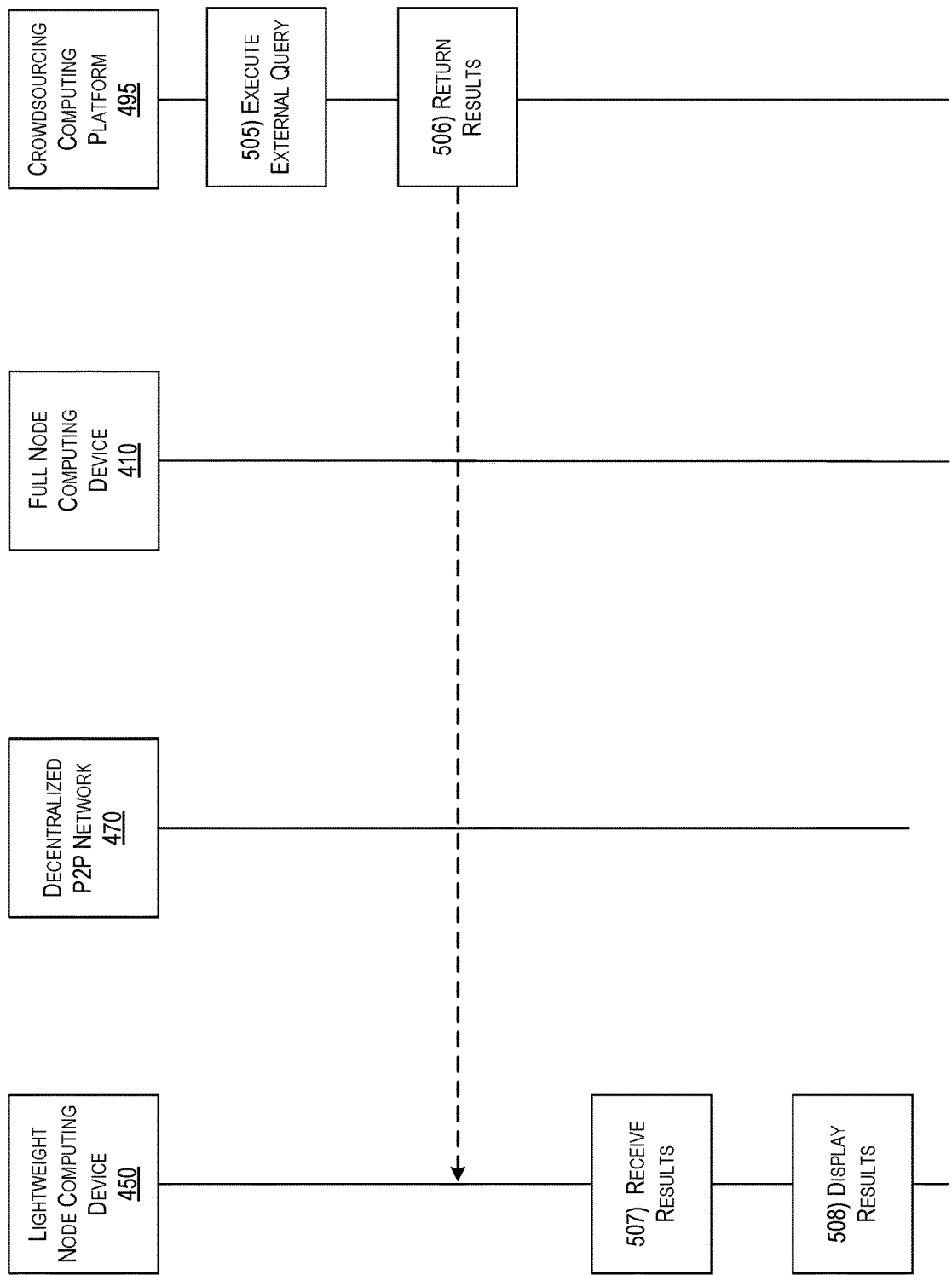

Referring to FIG. 5B, at step 505, crowdsourcing computing platform 495 may execute the external query request received from lightweight node computing device 450. In doing so, crowdsourcing computing platform 495 may perform a database request based on the identifier provided by lightweight node computing device 450. In some instances, the database request performed by crowdsourcing computing platform 495 may return previously stored data corresponding to the wallet and/or smart contract based on the identifier. For example, the database request may return an indication of whether or not the wallet and/or smart contract was previously flagged, a flag rating associated with the wallet and/or smart contract, a review rating and corresponding reviews associated with the wallet and/or smart contract, and so on.

At step 506, crowdsourcing computing platform 495 may return the results of the external query request to lightweight node computing device 450. At step 507, lightweight node computing device 450 may receive the results to the external query request from crowdsourcing computing device 495. At step 508, lightweight node computing device 450 may display the results to a user of lightweight node computing device 450. In some instances, the displayed results may include the results of the local query performed at step 502 by local node computing device 450 and/or the results of the external query performed at step 505 by crowdsourcing computing platform 495.

Referring to FIG. 5C, at step 509, lightweight node computing device 450 may request execution of the first network function request through decentralized P2P network 470. In doing so, processors of lightweight node computing device 450 may execute network commands to broadcast the first network function request to from a wallet associated with lightweight node computing device 450 to decentralized P2P network 470. As stated above, in the event that the first network function request is a balance sheet transaction request, the request may include at least a data type, data amount, processing fee amount to be distributed to full node computing devices within decentralized P2P network 470 for processing the balance sheet transaction request, and an identifier of the wallet of the node receiving the data transfer of the network function. In the event that the first network function request is a smart contract operation request, the request may include at least a data type, data amount, processing fee amount to be distributed to full node computing devices within decentralized P2P network 470 for processing the smart contract operation, and an identifier of the smart contract receiving the data transfer of the network function. Processors of lightweight node computing device 450 may execute digital signature algorithms to digitally sign the network function request with a private key associated with the wallet of lightweight node computing device 450.

At step 510, the first network function request may be distributed through decentralized P2P network 470 to each of the full node computing devices comprising decentralized P2P network 470. Accordingly, the first network function request may be distributed to full node computing device 410. At step 511, full node computing device 410 may receive the first network function request through network 470 and from lightweight node computing device 450. At step 512, decentralized P2P network 470 may distribute additional network function requests to each of the full node computing devices comprising decentralized P2P network 470, including full node computing device 410 from other nodes within network 470. In some instances, each of the additional network function requests may be associated with wallets corresponding to the other nodes within decentralized P2P network 470.

Figure 5D:
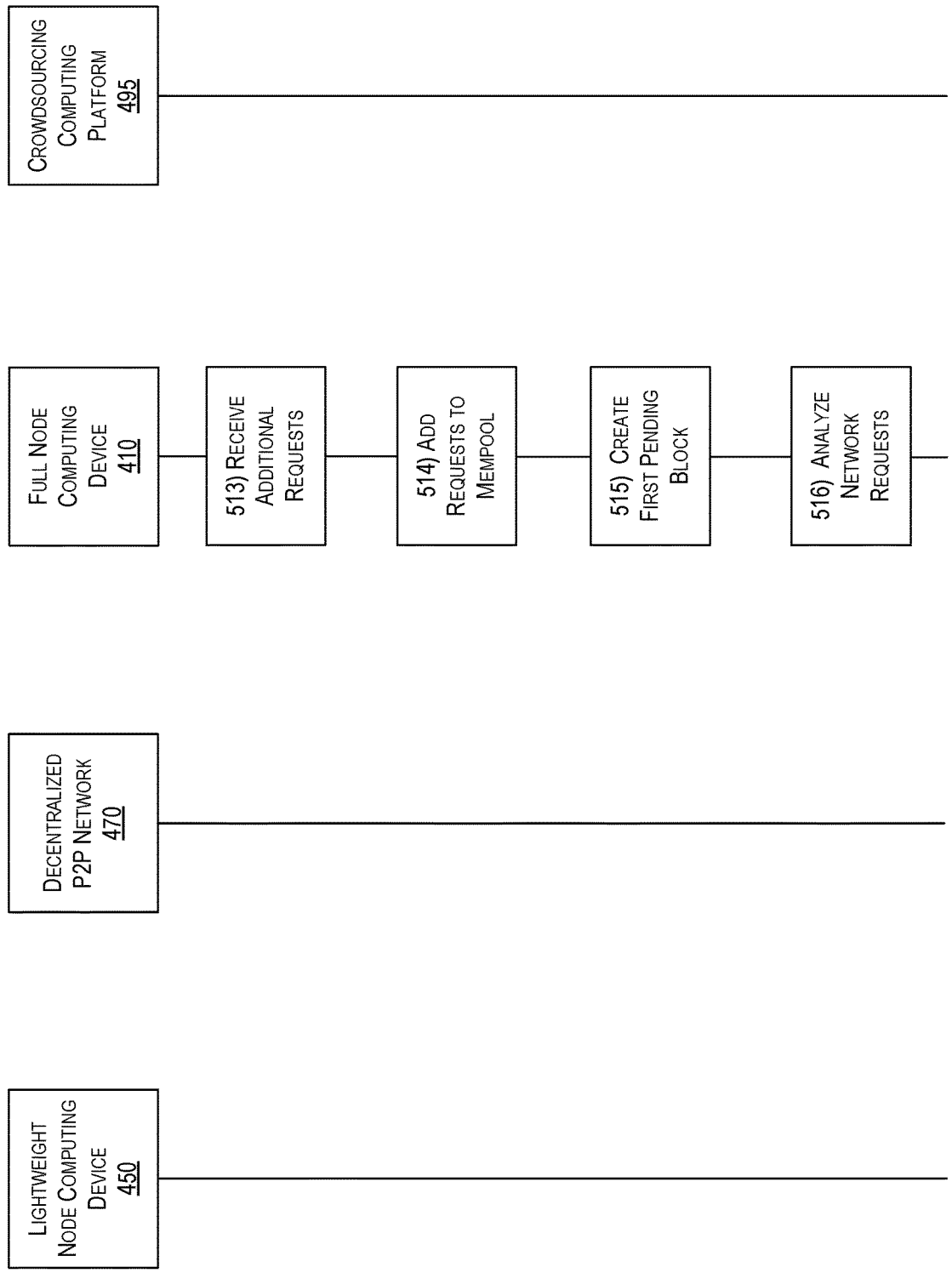

Referring to FIG. 5D, at step 513, full node computing device 410 may receive the additional network function requests through decentralized P2P network 470. At step 514, full node computing device 410 may add the network function request received from lightweight node computing device 450 and the additional network functions to a local memory pool (e.g., mempool). In some instances, the mempool maybe a memory allocation associated in memory 420 of full node computing device 410 which stores yet to be processed network function requests corresponding to decentralized P2P network 470. At step 515, full node computing device 410 may create a first pending block with one or more network function requests stored in the mempool. At step 516, processors of full node computing device 410 may execute blockchain analysis module 429 to analyze the network function requests included in the first pending block.

In the event that the network function requests correspond to balance sheet transaction requests, blockchain analysis module 429, when executed by processors of full node computing device 410, may cause full node computing device 410 to analyze the balance sheet transaction requests to identify whether or not the balance sheet transaction requests are associated with previously flagged wallets. Furthermore, blockchain analysis module 429 may cause full node computing device 410 to analyze the balance sheet transaction requests based on one or more security criteria to identify whether or not the balance sheet transaction requests include unexpected data and/or data irregularities. The one or more security criteria may include at least a relation to standard and/or approved balance sheet transaction requests of decentralized P2P network 470, a relation to previously identified unexpected data and/or data irregularities, and/or a relation to generic fraudulent data, malware, viruses, and/or other nefarious data.

For example, upon execution, blockchain analysis module 429 may cause full node computing device 410 to compare identifiers of wallets corresponding to the balance sheet transaction requests with identifiers of flagged wallets stored in flagged wallet and data repository 429. In some instances, blockchain analysis module 429 may cause full node computing device 410 to query crowdsourcing computing platform 495 and/or other computing nodes within decentralized network 470 to identify whether the identifiers of the wallets corresponding to the balance sheet transaction requests correspond to identifiers of previously flagged wallets.

Furthermore, blockchain analysis module 429 may cause full node computing device to compare the balance sheet transaction requests against the one or more security criteria. In particular, full node computing device 429 may compare the balance sheet transaction requests to standard and/or approved balance sheet transaction requests of decentralized P2P network 470, previously identified unexpected data and/or data irregularities, and/or generic fraudulent data, malware, viruses, and/or other nefarious data stored in flagged wallet and data repository 429. In some instances, blockchain analysis module 429 may cause full node computing device 410 to query crowdsourcing computing platform 495 and/or other computing nodes within decentralized network 470 to identify whether the balance sheet transaction requests abide by the one or more security criteria.

In the event that the network function requests correspond to smart contract operation requests, blockchain analysis module 429, when executed by processors of full node computing device 410, may cause full node computing device 410 to identify the blocks of blockchain 426 comprising the smart contracts corresponding to the smart contract operation requests. Blockchain analysis module 429 may store further instructions which cause full node computing device 410 to analyze the smart contracts within the identified blocks of blockchain 426 to identify whether or not the smart contracts corresponding smart contract operation requests were previously flagged. Furthermore, blockchain analysis module 429 may store instructions which cause full node computing device 410 to analyze the smart contracts within the identified blocks of blockchain 426 based on one or more security criteria to identify whether the smart contracts include unexpected data and/or data irregularities. The one or more security criteria may include at least a relation to standard and/or approved smart contracts of decentralized P2P network 470, a relation to previously identified unexpected data and/or data irregularities, and/or a relation to generic fraudulent data, malware, viruses, and/or other nefarious data.

For example, upon execution, blockchain analysis module 429 may cause full node computing device 410 to compare identifiers of the smart contracts corresponding to the smart contract operation requests with identifiers of flagged smart contracts stored in flagged wallet and data repository 429. In some instances, blockchain analysis module 429 may cause full node computing device 410 to query crowdsourcing computing platform 495 and/or other computing nodes within decentralized network 470 to identify whether the identifiers of the smart contracts identified by the smart contract operation requests correspond to identifiers of previously flagged smart contracts.

Furthermore, blockchain analysis module 429 may cause full node computing device 410 to compare the smart contracts corresponding to the smart contract operation requests against the one or more security criteria. In particular, full node computing device 429 may compare the smart contracts to standard and/or approved smart contracts of decentralized P2P network 470, previously identified unexpected data and/or data irregularities, and/or generic fraudulent data, malware, viruses, and/or other nefarious data stored in flagged wallet and data repository 429. In some instances, blockchain analysis module 429 may cause full node computing device 410 to query crowdsourcing computing platform 495 and/or other computing nodes within decentralized network 470 to identify whether the smart contracts identified by the smart contract operation requests abide by the one or more security criteria.

Figure 5E:
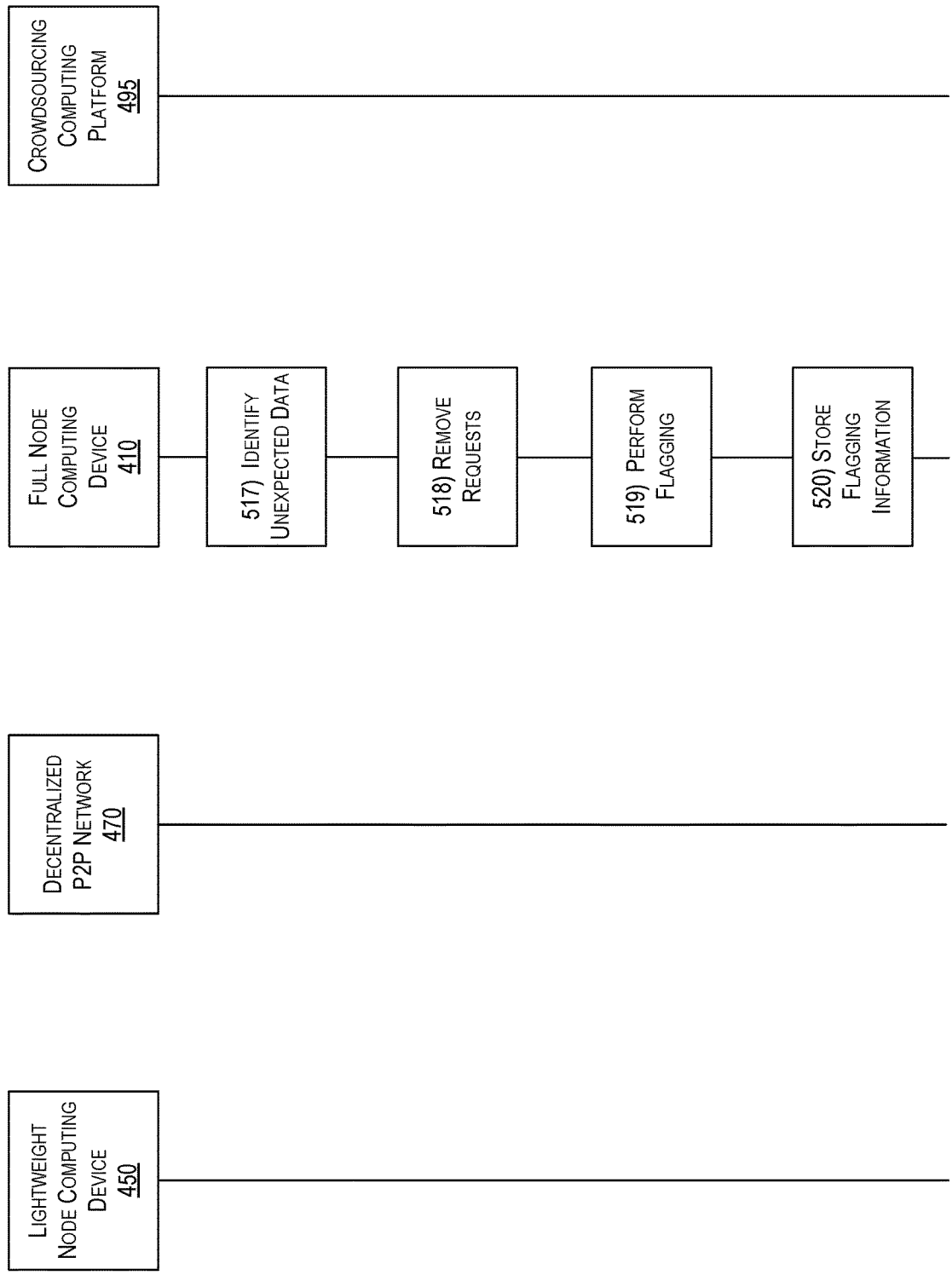

Referring to FIG. 5E, at step 517, full node computing device 410 may identify one or more network function requests that correspond to previously flagged wallets and/or smart contracts, and/or one or more network function requests that include unexpected data and/or data irregularities.

For example, in the event that the network function requests are balance sheet transaction requests, identifying that the balance sheet transaction requests correspond to flagged wallets may involve matching identifiers of wallets associated with the balance sheet transaction requests to identifiers of wallets that were are previously flagged and stored flagged wallet and data repository 429. In some instances, the querying of crowdsourcing computing platform 495 and/or other computing nodes within decentralized network 470 may return results indicating that wallets associated with the balance sheet transaction requests were previously flagged.

Furthermore, identifying unexpected data and/or data irregularities stored within the balance sheet transaction requests may involve comparing the balance sheet transaction requests to the one or more security criteria. For example, to identify the unexpected data and/or data irregularities, full node computing device 410 may not match the balance sheet transaction requests with standard and/or approved balance sheet transaction requests of decentralized P2P network 470. Additionally and/or alternatively, to identify the unexpected data and/or data irregularities, full node computing device 410 may match the balance sheet transaction requests with previously identified unexpected data and/or data irregularities and/or generic fraudulent data, malware, viruses, and/or other nefarious data. In some instances, the querying of crowdsourcing computing platform 495 and/or other computing nodes within decentralized network 470 may return results indicating that the balance sheet transaction requests do not abide by the one or more security criteria.

In the event that the network function requests correspond to smart contract operation requests, identifying that the smart contract operation requests correspond to flagged smart contracts may involve matching identifiers of smart contracts associated with the smart contract operation requests with identifiers of smart contracts that were are previously flagged and stored in flagged wallet and data repository 429. In some instances, the querying of crowdsourcing computing platform 495 and/or other computing nodes within decentralized network 470 may return results indicating that smart contracts associated with the smart contract operation requests were previously flagged.

Furthermore, identifying unexpected data and/or data irregularities stored within the smart contracts may involve comparing the smart contracts to the one or more security criteria. For example, to identify the unexpected data and/or data irregularities, full node computing device 410 may not match the smart contract with standard and/or approved smart contracts of decentralized P2P network 470. Additionally and/or alternatively, to identify the unexpected data and/or data irregularities, full node computing device 410 may match at least a portion of the smart contract with previously identified unexpected data and/or data irregularities and/or generic fraudulent data, malware, viruses, and/or other nefarious data. In some instances, the querying of crowdsourcing computing platform 495 and/or other computing nodes within decentralized network 470 may return results indicating that the smart contracts corresponding to the smart contract operation requests do not abide by the one or more security criteria.

At step 518, full node computing device 410 may remove any network function requests from the first pending block which are identified as including unexpected data and/or data irregularities. In some instances, the removed network function requests may be returned to the mempool and/or be removed from the mempool in memory 420 of full node computing device 410. Additionally and/or alternatively, full node computing device 410 may further remove any network function requests associated with identified flagged wallets and/or smart contracts. In some instances, such processes may be performed by full node computing device 410 based on execution of instructions stored in blockchain analysis module 429.

At step 519, processors of full node computing device 410 may execute instructions of blockchain analysis module 429, which may cause full node computing device 410 to flag the wallets and/or smart contracts associated with the unexpected data and/or data irregularities. In instances in which the wallets and/or smart contracts were previously flagged, full node computing device 410 may further analyze the balance sheet transaction requests associated with the previously flagged wallets and/or the previously flagged smart contracts associated with the smart contract operation requests to determine whether or not the balance sheet transaction requests associated with the previously flagged wallets and/or the previously flagged smart contracts associated with the smart contract operation requests include unexpected data and/or data irregularities based on the one or more security criteria. In the event that the balance sheet transaction requests associated with the previously flagged wallets include unexpected data and/or data irregularities and/or the flagged smart contracts associated with the smart contract operation requests include unexpected data and/or data irregularities, full node computing device 410 may flag the previously flagged wallets and/or smart contracts again.

At step 520, full node computing device 410 may store the flagging information regarding the wallets and/or smart contracts in flagged wallet and data repository 429. In the event that the wallets and/or smart contracts had not been previously flagged, full node computing device 410 may create first entries corresponding to the flagged wallets and/or smart contracts in flagged wallet and data repository 429. The first entries may include identifiers associated with the flagged wallets and/or smart contracts, as well as the unexpected data and/or data irregularities for which the wallets and/or smart contracts were flagged. In some instances, the first entries may further include a user provided note corresponding to the flagged wallets and/or smart contracts. In the event that the wallets and/or smart contracts had been previously flagged, full node computing device 410 may update a flag rating associated with wallets and/or smart contracts to reflect the immediate flagging.

Figure 5F:
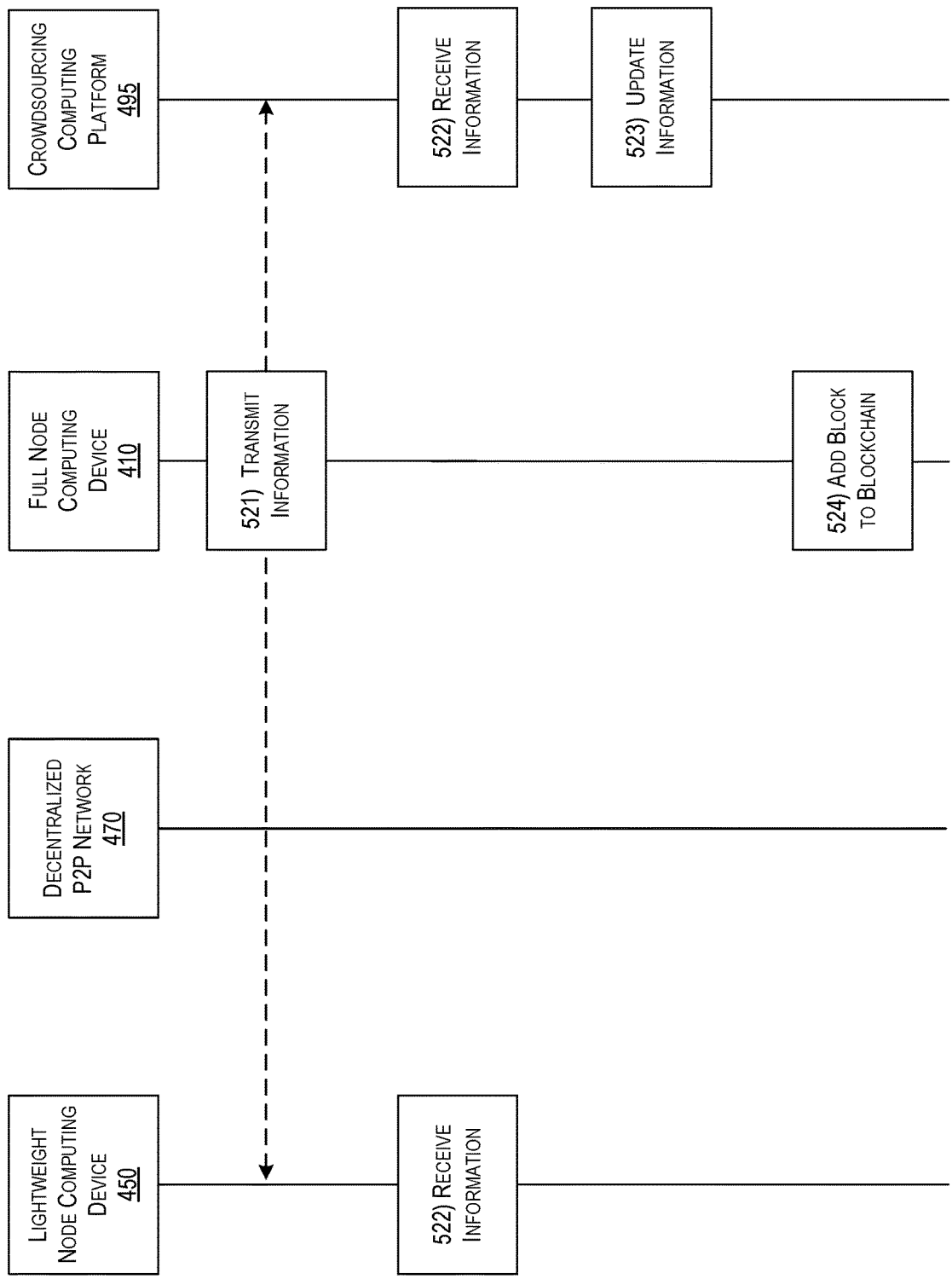

Referring to FIG. 5F, at step 521, full node computing device 410 may transmit information corresponding to the flagged wallets and/or smart contracts to lightweight node computing device 450 and/or crowdsourcing computing platform 495. The information corresponding to the flagging may include identifiers of the flagged wallets and/or smart contracts, as well as the unexpected data and/or data irregularities. Additionally and/or alternatively, the information corresponding to the flagging may include the updated flag rating, review ratings for the flagged wallets and/or smart contracts, and/or reviews associated with flagged wallets and/or smart contracts. In some instances, full node computing device 410 may transmit the information to other nodes within decentralized P2P network 470. Full node computing device 410 may also transmit the information regarding the flagging through decentralized P2P network 470 for it to be distributed to each node within the network.

At step 522, lightweight node computing device 450 and/or crowdsourcing computing platform 495 may receive the information corresponding to the flagging from full node computing device 410. At step 523, crowdsourcing computing platform 495 may update the database storing information concerning flagged wallets and/or smart contracts and unexpected data and/or data irregularities. In some instances, the updating may further entail updated the flag ratings, review ratings, and/or reviews associated with the flagged wallets and/or smart contracts.

At step 524, full node computing device 410 may add the first pending block to blockchain 426 and distribute the block to decentralized P2P network 470 to each of the other nodes within the network. In doing so, full node computing device 410 may identify the nonce and/or be selected to use its public key as the nonce based on the consensus algorithms in the manner described herein. In some instances, however, full node computing device 410 may not identify the nonce and/or be selected to use its public key as the nonce and, as such, may not add the first pending block to blockchain 426. Instead, full node computing device 410 may add a block to blockchain 426 that was created by another full node computing device within decentralized P2P network 470. Full node computing device 410 may receive the block through decentralized P2P network 470 from the full node computing device that created the block.

In one embodiment, full node computing device 410 may identify that one or more network function requests is a smart contract operation request which identifies a smart contract that was previously flagged. Full node computing device 410 may identify a block of blockchain 426 which comprises the smart contract identified in the smart contract operation request. Full node computing device 410 may parse the smart contract to identify one or more operations associated with the smart contract. Full node computing device 410 may analyze and/or compare the one or more operations associated with the smart contract against the one or more security criteria. In doing so, full node computing device 410 may determine that at least one of the one or more operations is a malicious operation and may execute the smart contract but without executing the at least one of the one or more operations determined to be malicious.

Figure 5G:
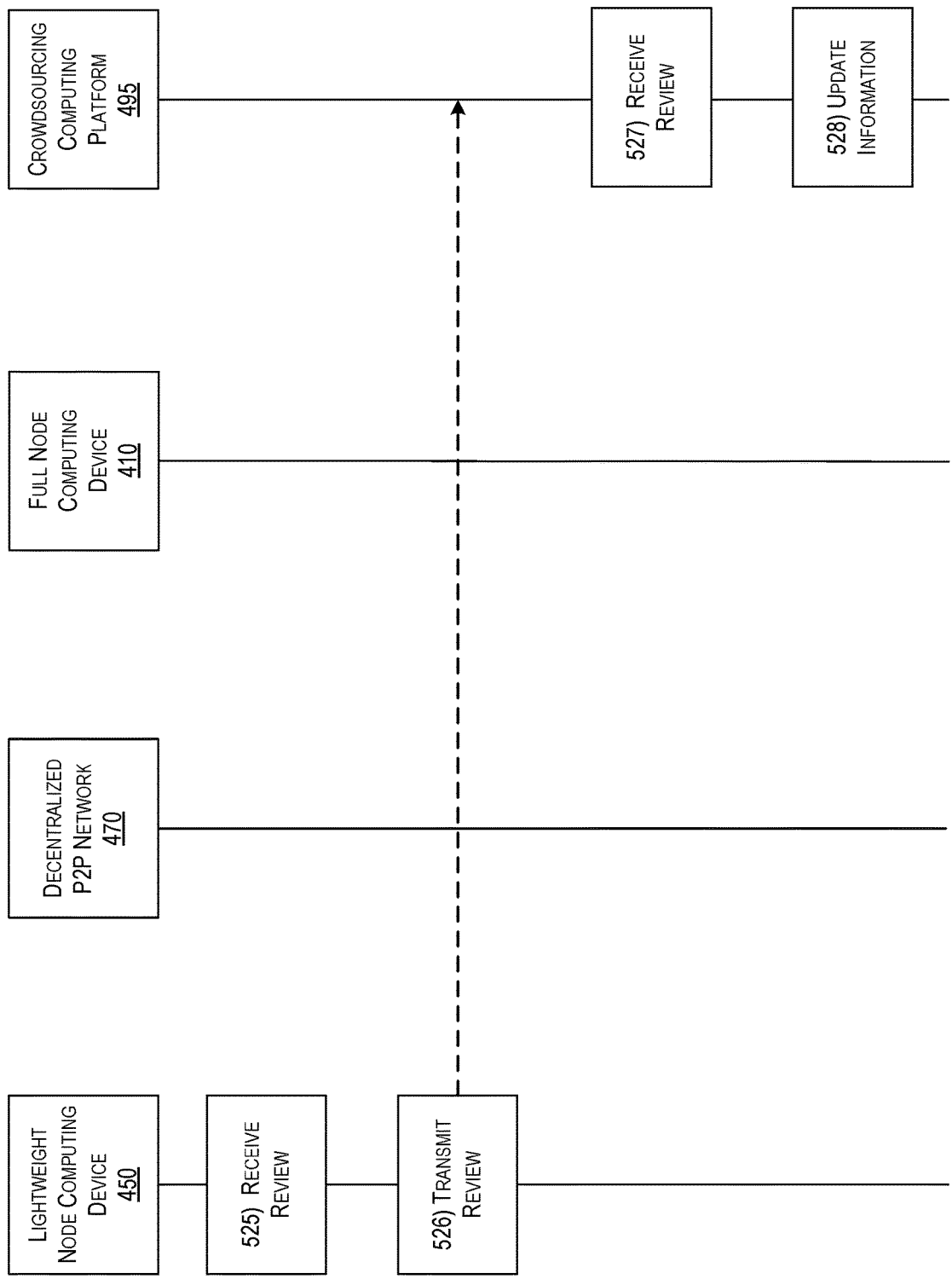

Referring to FIG. 5G, at step 525, a user of lightweight node computing device 450 may provide a review corresponding to the network function requested at step 509. In the event that the requested network function corresponded to a balance sheet transaction request, the review may include information corresponding to an entity associated with the wallet receiving the data transfer of the balance sheet transaction request. For example, lightweight node computing device 450 may have requested the balance sheet transaction to transfer cryptocurrency to a wallet associated with a particular in return for goods and/or services. The review may describe the efficacy of the entity in providing the goods and/or services. Additionally and/or alternatively, the review may further include a review rating associated with the entity corresponding to the wallet. In the event that the requested network function corresponded to a smart contract operation request, the review may include information corresponding to the smart contract associated with the requested smart contract operation and/or an entity associated with the smart contract. As with the review for the entity corresponding to the wallet receiving the funds in the balance sheet transaction request, the review of the smart contract and/or entity associated with the smart contract may include a review rating.

At step 526, lightweight node computing device 450 may transmit the review provided by the user to crowdsourcing computing device 495. In some instances, lightweight node computing device 450 may transmit the review to full node computing device 410. Additionally and/or alternatively, lightweight node computing device 450 may transmit the review to decentralized P2P network 470 and the review may be distributed to each node in decentralized P2P network 470. Furthermore, lightweight node computing 450 may update flagged wallet and data repository 469 to include the review At step 527, crowdsourcing computing platform 495 may receive the review from lightweight node computing device 450. At step 528, crowdsourcing computing platform 495 may update the database storing information concerning review ratings and/or reviews associated with wallets and/or smart contracts.

While steps 501-528 are described in relation to a first network function request provided by lightweight node computing device 450 and a first pending block associated with full node computing device 450, it should be understood that the description may apply to a plurality of additional network function requests and/or pending blocks.

Figure 6:
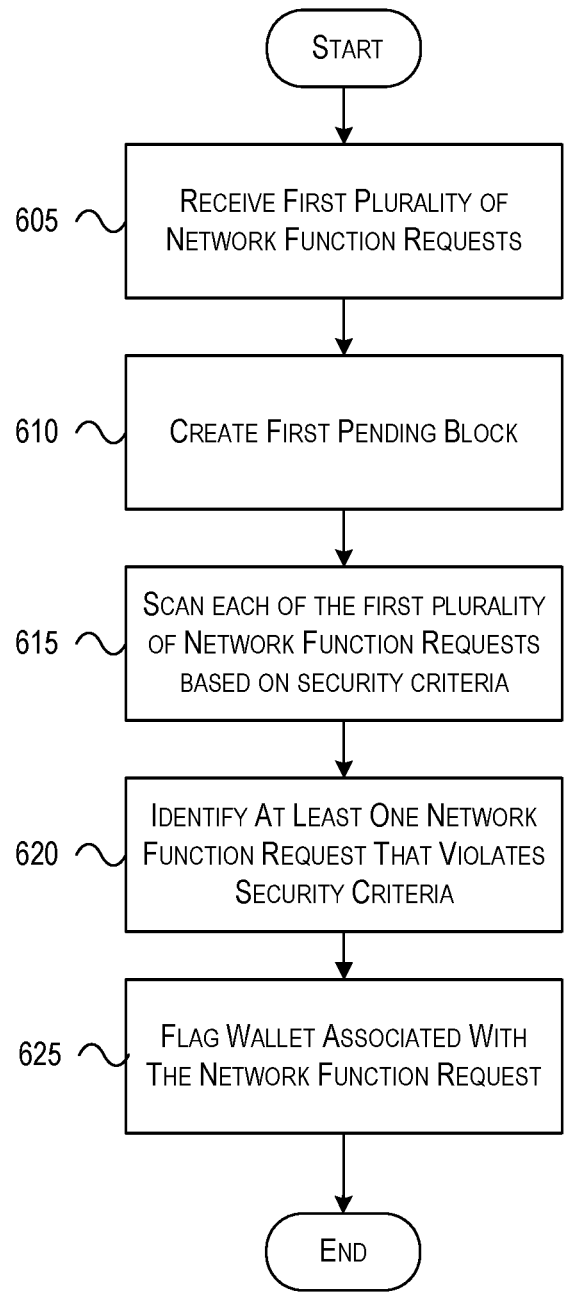
FIG. 6 depicts an illustrative method for blockchain-based unexpected data detection in accordance with one or more example embodiments described herein.

FIG. 6 depicts an illustrative method for blockchain-based unexpected data detection in accordance with one or more example embodiments described herein. Referring to FIG. 6, at step 605, a computing device configured to operate in a P2P network and including at least one or more processors and memory storing at least a blockchain of the P2P network may receive a first plurality of network function requests, wherein each of the first plurality of network function requests is associated with a particular wallet. At step 610, the computing device may create a first pending block of the blockchain of the P2P network, wherein the first pending block includes the first plurality of network function requests. At step 615, the computing device may scan each of the first plurality of network function requests based on one or more security criteria. At step 620, based on the scanning, the computing device may identify at least one network function request of the plurality of network function requests that violates at least one of the one or more security criteria. At step 625, responsive to identifying the at least one network function request that violates at least one of the one or more security criteria, the computing device may flag at least one wallet associated with the at least one network function request.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
at a computing device configured to operate in a peer-to-peer (P2P) network, the computing device including at least one or more processors and memory storing at least a portion of a blockchain of the P2P network:
  receiving a first plurality of network function requests, wherein each of the first plurality of network function requests is associated with a particular wallet;
  creating a first pending block of the blockchain of the P2P network, wherein the first pending block includes the first plurality of network function requests;
  scanning each of the first plurality of network function requests based on one or more previously identified data irregularities;
  based on the scanning, identifying at least one network function request of the first plurality of network function requests that at least a first data irregularity of the one or more previously identified data irregularities;
  responsive to identifying the at least one network function request that includes at least a first data irregularity of the one or more previously identified data irregularities, flagging at least one wallet associated with the at least one network function request;
  storing the at least one flagged wallet with an identifier associated with the at least one flagged wallet;
  comparing the identifier corresponding to the at least one flagged wallet with a plurality of identifiers corresponding to previously flagged wallets, wherein each of the previously flagged wallets is associated with a flag rating;
  based on the comparison, identifying that the identifier corresponding to the at least one flagged wallet matches with at least one of the plurality of identifiers corresponding to the previously flagged wallets; and
  updating the flag rating associated with the at least one flagged wallet matched with at least one of the previously flagged wallets.

2. The method of claim 1, further comprising:
receiving, from a user of the computing device, entry of information corresponding to a network function request involving the at least one flagged wallet; and
displaying the flag rating associated with the at least one flagged wallet.

3. The method of claim 2, wherein the network function request and the first plurality of network function requests include one or more of balance sheet transaction requests and smart contract operation requests.

4. The method of claim 1, further comprising:
adding the first pending block to the blockchain of the P2P network; and
receiving a second plurality of network function requests related to a second pending block of the blockchain of the P2P network, wherein at least one of the second plurality of network function requests references the at least one flagged wallet.

5. The method of claim 4, further comprising:
removing the at least one of the second plurality of network function requests from the second pending block based on the reference to the at least one flagged wallet; and adding the second pending block to the blockchain of the P2P network without performing a function corresponding to the at least one of the second plurality of network function requests.

6. The method of claim 4, further comprising:
wherein the at least one of the plurality of network function requests that references the at least one flagged wallet is a smart contract request associated with the at least one flagged wallet,
identifying a block of the blockchain comprising a smart contract corresponding to the smart contract request;
parsing the smart contract to identify one or more operations associated with the smart contract;
determining that at least one of the one or more operations is a malicious operation;
executing the smart contract without performing the malicious operation; and
adding the second pending block to the blockchain of the P2P network.

7. A computing device configured to operate in a peer-to-peer (P2P) network, comprising:
one or more processors; and
memory storing at least a portion of a blockchain of the P2P network and computer-readable instructions that, when executed by the one or more processors, cause the computing device to:
receive a first plurality of network function requests, wherein each of the first plurality of network function requests is associated a particular wallet;
create a first pending block of the blockchain of the P2P network, wherein the first pending block includes the first plurality of network function requests;
scan each of the first plurality of network function requests based on one or more previously identified data irregularities;
based on the scanning, identify at least one network function request of the first plurality of network function requests that includes at least a first data irregularity of the one or more previously identified data irregularities;
responsive to identifying the at least one network function request that includes at least a first data irregularity of the one or more previously identified data irregularities, flag at least one wallet associated with the at least one network function request;
store the at least one flagged wallet with an identifier associated with the at least one flagged wallet;
compare the identifier corresponding to the at least one flagged wallet with a plurality of identifiers corresponding to previously flagged wallets, wherein each of the previously flagged wallets is associated with a reputability rating;
based on the comparison, identify that the identifier corresponding to the at least one flagged wallet matches with at least one of the plurality of identifiers corresponding to the previously flagged wallets; and
update the reputability rating associated with the at least one flagged wallet matched with at least one of the previously flagged wallets.

8. The computing device of claim 7, wherein the memory stores further computer-readable instructions that, when executed by the one or more processors, cause the computing device to:
receive, from a user of the computing device, entry of information corresponding to a network function request involving the at least one flagged wallet; and
display the reputability rating associated with the at least one flagged wallet.

9. The computing device of claim 8, wherein the network function request and the first plurality of network function requests include one or more of balance sheet transaction requests and smart contract operation requests.

10. The computing device of claim 7, wherein the memory stores further computer-readable instructions that, when executed by the one or more processors, cause the computing device to:
add the first pending block to the blockchain of the P2P network; and
receive a second plurality of network function requests related to a second pending block of the blockchain of the P2P network, wherein at least one of the second plurality of network function requests references the at least one flagged wallet.

11. The computing device of claim 10, wherein the memory stores further computer-readable instructions that, when executed by the one or more processors, cause the computing device to:
remove the at least one of the second plurality of network function requests from the second pending block based on the reference to the at least one flagged wallet; and
add the second pending block to the blockchain of the P2P network without performing a function corresponding to the at least one of the second plurality of network function requests.

12. The computing device of claim 10, wherein the at least one of the plurality of network function requests that references the at least one flagged wallet is a smart contract request associated with the at least one flagged wallet, and wherein the memory stores further computer-readable instructions that, when executed by the one or more processors, cause the computing device to:
receive a first plurality of network function requests, wherein each of the first plurality of network function requests are associated with one or more wallets;
create a first pending block of the blockchain of the P2P network, wherein the first pending block includes the first plurality of network function requests;
scan each of the first plurality of network function requests based on one or more security criteria;
based on the scanning, identify at least one network function request of the plurality of network function requests that violates at least one of the one or more security criteria; and
responsive to identifying the at least one network function request that violates at least one of the one or more security criteria, flag at least one wallet associated with the at least one network function request.

13. One or more non-transitory computer-readable media storing instructions that, when executed by a computing device configured to operate in a peer-to-peer (P2P) network, the computing device including at least one or more processors and memory storing at least a portion of a blockchain of the (P2P) network, cause the computing device to:
receive a first plurality of network function requests related to a first pending block of the blockchain of the P2P network, wherein each of the first plurality of network function requests are associated with one or more wallets;
scan each of the first plurality of network function requests based on one or more previously identified data irregularities;

based on the scanning, identify at least one network function request of the first plurality of network function requests that includes at least a first data irregularity of the one or more previously identified data irregularities;

responsive to identifying the at least one network function request that includes at least a first data irregularity of the one or more data irregularities, flag at least one wallet associated with the at least one network function request;

store the at least one flagged walled with an identifier associated with the at least one flagged wallet;

compare the identifier corresponding to the at least one flagged wallet with a plurality of identifiers corresponding to previously flagged wallets, wherein each of the previously flagged wallets is associated with a reputability rating;

based on the comparison, identify that the identifier corresponding to the at least one flagged wallet matches with at least one of the plurality of identifiers corresponding to the previously flagged wallets; and update the reputability rating associated with the at least one flagged wallet matched with at least one of the previously flagged wallets.

14. The one or more non-transitory computer-readable media of claim 13, storing additional instructions that, when executed by the computing device, cause the computing device to:

receive, from a user of the computing device, entry of information corresponding to a network function request involving the at least one flagged wallet; and display the reputability rating associated with the at least one flagged wallet.

15. The one or more non-transitory computer-readable media of claim 13, storing additional instructions that, when executed by the computing device, cause the computing device to:

add the first pending block to the blockchain of the P2P network; and receive a second plurality of network function requests related to a second pending block of the blockchain of the P2P network, wherein at least one of the second plurality of network function requests references the at least one flagged wallet.

16. The one or more non-transitory computer-readable media of claim 15, storing additional instructions that, when executed by the computing device, cause the computing device to:

remove the at least one of the second plurality of network function requests from the second pending block based on the reference to the at least one flagged wallet; and add the second pending block to the blockchain of the P2P network without performing a function corresponding to the at least one of the second plurality of network function requests.

17. The one or more non-transitory computer-readable media of claim 15, storing additional instructions that, when executed by the computing device, cause the computing device to:

wherein the at least one of the plurality of network function requests that references the at least one flagged wallet is a smart contract request associated with the at least one flagged wallet, identify a block of the blockchain comprising a smart contract corresponding to the smart contract request;

parse the smart contract to identify one or more operations associated with the smart contract;

determine that at least one of the one or more operations is a malicious operation;

execute the smart contract without performing the malicious operation; and add the second pending block to the blockchain of the P2P network.

* * * * *